(12) United States Patent
Gaur et al.

(10) Patent No.: US 8,711,975 B2
(45) Date of Patent: *Apr. 29, 2014

(54) TOMLINSON HARASHIMA PRECODING WITH ADDITIONAL RECEIVER PROCESSING IN A MULTI-USER MULTIPLE-INPUT MULTIPLE-OUTPUT WIRELESS TRANSMISSION SYSTEM

(71) Applicant: Hitachi, Ltd., Tokyo (JP)

(72) Inventors: Sudhanshu Gaur, Campbell, CA (US); Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,619

(22) Filed: May 2, 2013

(65) Prior Publication Data
US 2013/0243109 A1 Sep. 19, 2013

Related U.S. Application Data

(63) Continuation of application No. 13/377,866, filed as application No. PCT/US2010/027958 on Mar. 19, 2010, now Pat. No. 8,451,944.

(60) Provisional application No. 61/239,888, filed on Sep. 4, 2009, provisional application No. 61/241,126, filed on Sep. 10, 2009.

(51) Int. Cl.
*H04K 1/02* (2006.01)
*H04L 25/03* (2006.01)
*H04L 25/49* (2006.01)

(52) U.S. Cl.
USPC ............ 375/296; 375/299; 375/346; 375/350

(58) Field of Classification Search
USPC ................. 375/130, 140–141, 144, 146–148, 375/229–232, 259–262, 271, 272, 279, 375/284–285, 295–296, 316, 322, 324–325, 375/340–341, 346–350
See application file for complete search history.

(56) References Cited

U.S. PATENT DOCUMENTS 8,175,189 B2 * 5/2012 Gaur ............................ 375/296
8,451,944 B2 * 5/2013 Gaur et al. ................... 375/296

(Continued)

FOREIGN PATENT DOCUMENTS

WO 2009/057876 A1 5/2009
WO 2009/076819 A1 6/2009

OTHER PUBLICATIONS

C. Windpassinger et al., Precoding in Multiantenna and Multiuser Communications, IEEE Transactions on Wireless Communications, vol. 3, No. 4, Jul. 4, 2004.

(Continued)

*Primary Examiner* — Leon Flores
*Assistant Examiner* — James M Perez
(74) *Attorney, Agent, or Firm* — Mattingly & Malur, PC

(57) ABSTRACT

A method for processing user symbols with Tomlinson Harashima precoder (THP) in a base station, of a wireless system having K user terminals (UEs) which communicate with the base station via an uplink channel and a corresponding downlink (DL) channel, comprises estimating DL channel matrix; determining receiver processing matrix; computing effective matrix DL channel $H_{eff}$; performing QR decomposition of $H_{eff}$; computing THP matrices; calculating scalar weights for the UEs; processing user symbols by the THP having the THP matrices to produce an output of filtered vector symbols for the UEs; directing output of the THP to a channel represented by the DL channel matrix through which communications occur in the wireless system with the UEs; providing the receiver processing matrix to the UEs for performing additional receiver processing on the transmitted signals; and providing the scalar weights to the UEs to be used on the transmitted signals at the UEs.

20 Claims, 6 Drawing Sheets

(56) References Cited

U.S. PATENT DOCUMENTS

| | | | |
|---|---|---|---|
| 2007/0253508 A1* | 11/2007 | Zhou et al. | 375/267 |
| 2008/0112504 A1* | 5/2008 | Jiang et al. | 375/296 |
| 2009/0290656 A1* | 11/2009 | Yang et al. | 375/267 |
| 2010/0208837 A1* | 8/2010 | Vetter et al. | 375/267 |
| 2010/0232494 A1* | 9/2010 | Gaur | 375/233 |
| 2010/0310001 A1* | 12/2010 | Yeh et al. | 375/267 |
| 2011/0058598 A1* | 3/2011 | Gaur | 375/233 |
| 2011/0058599 A1* | 3/2011 | Gaur | 375/233 |
| 2012/0201200 A1* | 8/2012 | Gaur | 370/328 |

OTHER PUBLICATIONS

W. Yu, "Competition and Cooperation in Multi-User Communication Environments", PhD Dissertation, 128 pages, Jun. 2002.

N. Jindal et al., "Sum Power Iterative Water-Filling for Multi-Antenna Gaussian Broadcast Channels", IEEE Transactions on Information Theory, vol. 51, No. 4, pp. 1570-1580, Apr. 2005.

* cited by examiner

TOMLINSON HARASHIMA PRECODING WITH ADDITIONAL RECEIVER PROCESSING IN A MULTI-USER MULTIPLE-INPUT MULTIPLE-OUTPUT WIRELESS TRANSMISSION SYSTEM

RELATED APPLICATIONS

The present application is a continuation of U.S. patent application Ser. No. 13/377,866, filed Dec. 13, 2011, which is a 371 of PCT/US10/27958, filed Mar. 19, 2010, which is based on and claims priority from U.S. Provisional Patent Application No. 61/239,888, filed Sep. 4, 2009, and No. 61/241,126, filed Sep. 10, 2009. The present application is related to U.S. patent application Ser. No. 12/401,711, filed Mar. 11, 2009, and No. 12/554,069 and No. 12/554,082, filed Sep. 4, 2009. The entire disclosures of these applications are incorporated herein by reference.

BACKGROUND OF THE INVENTION

The present invention relates generally to multiple-input multiple-output (MIMO) communications systems and, more particularly, to Tomlinson Harashima precoding with additional receiver processing in a MIMO network.

It is well known that a Generalized Decision Feedback Equalizer (GDFE) based precoder provides the optimal capacity solution for Multi-user Multiple-Input Multiple-Output (MU-MIMO) wireless systems. However, the computational cost of determining various filters associated with the GDFE precoder is often prohibitive and is not suitable for many practical systems.

There are several known precoding techniques which can enable a Base Station (BS) equipped with multiple antennas to send simultaneous data streams to multiple user terminals (UEs) in order to optimize system capacity. In general, precoding for a MU-MIMO system aims to optimize a certain criterion such as system capacity or bit error rate. Selected references are noted below, together with a description of relevant aspects of the techniques proposed therein.

C. Windpassinger, R. F. H Fischer, T. Vencel, and J. B Huber, "Precoding in multi-antenna and multi-user communications", IEEE Transactions on Wireless Communications, pp. 1305-1316, July 2004 [1] describes a nonlinear precoding scheme known as Tomlinson-Harashima Precoding (THP). This scheme relies on successive interference pre-cancellation at the BS. A modulo operation is used to ensure that transmit power is not exceeded. Different from BD, THP triangularizes the effective channel matrix and provides somewhat higher system capacity when compared to BD. In W. Yu, "Competition and Cooperation in Multi-User Communication Environments", PhD Dissertation, Stanford University, February 2002 [2], Wei Yu introduced the GDFE precoder and showed that it achieves a high degree of system capacity. Although, this technique achieves a high degree of system capacity, the computational cost of determining the GDFE precoder components is effectively prohibitive for a real-time implementation required by most practical systems. N. Jindal, W. Rhee, S. Vishwanath, S. A. Jafar, and A. Goldsmith, "Sum Power Iterative Water-filling for Multi-Antenna Gaussian Broadcast Channels", IEEE Transactions on Information Theory, pp. 1570-1580, April 2005 [3] derives a very useful result referred to as the MAC/BC (multiple access channel/broadcast channel) duality. The entire disclosures of the above references are incorporated herein by reference.

BRIEF SUMMARY OF THE INVENTION

In Ser. No. 12/401,711 and Ser. No. 12/554,082, computationally efficient algorithms are presented for implementing the GDFE precoder, which is known to achieve broadcast channel (BC) capacity. While the algorithms in those two applications simplify the GDFE implementation from the viewpoint of computational complexity, they still do not overcome GDFE's inherent requirement of allocating unequal powers in different transmit antennas. This unequal power allocation may possibly cause problems in practical systems due to the nonlinear nature of power amplifiers used in wireless transmitters. As one solution, the present invention focuses on a modification of another nonlinear precoding technique called the Tomlinson Harashima Precoder (THP). Although the optimal power allocation in THP is also unequal, our modification achieves near optimal capacity even with equal power allocations. An additional contribution is about channel feedback. Conventional THP techniques require full channel matrix feedback from the receivers to the transmitter. As another solution, the present invention presents a method to implement a variant of the THP technique with partial channel feedback. The proposed method avoids full channel feedback overhead and leads to reasonable degradation in achievable capacity.

Exemplary embodiments of the invention provide a technique for Tomlinson Harashima precoding (THP) with additional receiver processing in MU-MIMO systems, which significantly reduces the computational cost while resulting in no capacity loss. The technique is suitable for improving the performance of various MU-MIMO wireless systems including presently planned future "4G" cellular networks.

An aspect of the present invention is directed to a method for processing user symbols with a Tomlinson Harashima precoder in a base station (BS) of a multi-user multiple-input multiple-output (MU-MIMO) wireless system having K user terminals (UEs) which communicate with the base station via an uplink (UL) channel and a corresponding downlink (DL) channel, the base station having N antennas and $P_t$ as available transmit power. The method comprises estimating a DL channel matrix $H_k$ for each of the K UEs; determining a receiver processing matrix $V_k$ for each of the K UEs; computing, based on the DL channel matrix $H_k$ and the receiver processing matrix $V_k$, an effective matrix DL channel $H_{\it{eff}}$; performing a QR decomposition (QRD) of the effective DL channel matrix $H_{\it{eff}}$ with column pivoting in which Q is a unitary matrix and R is an upper triangular matrix; computing Tomlinson Harashima precoder matrices using the unitary matrix Q and the upper triangular matrix R; calculating scalar weights for the UEs using the upper triangular matrix R; processing user symbols by the Tomlinson Harashima precoder having the Tomlinson Harashima precoder matrices to produce an output of filtered vector symbols for the UEs; directing the output of the Tomlinson Harashima precoder to the channel represented by the DL channel matrix through which communications occur in the wireless system with the user terminals; performing additional receiver processing on the transmitted signals at the UEs based on the receiver processing matrix $V_k$ for each of the K UEs; and using the scalar weights on the transmitted signals at the UEs.

In some embodiments, the DL channel matrix H is $H=[H_1^H, \ldots, H_K^H]^H$, and determining a receiver processing matrix $V_k$ for each of the K UEs comprises determining by the BS an input covariance matrices $\Phi_k$ for a corresponding UL channel $H_k^H$ for the $k^{th}$ UE, for each of the K UEs, $\Phi_k = E[u_k u_k^H]$, where $u=[u_1^H u_2^H \ldots u_K^H]^H$ denotes a joint transmit vector for all UEs, and E[.] indicates time average of its argument; assuming that a total transmit power used by all UEs will not exceed the available transmit power $P_t$ at the BS for original downlink transmission, $$\sum_{k=1}^{K} \text{trace}(\Phi_k) \leq P_t;$$

determining eigenvectors associated $U_k$ with each $\Phi_k$ as $\Phi_k = U_k \Gamma_k U_k^H$; and setting a receiver processing matrix $V_k$ associated with the $k^{th}$ UE as $V_k = U_k^H$. Computing an effective DL channel matrix $H_{\mathit{eff}}$ comprises computing by the BS $$H_{\mathit{eff}} = \begin{bmatrix} \hat{H}_1 \\ \hat{H}_2 \\ \cdots \\ \hat{H}_K \end{bmatrix} = \begin{bmatrix} V_1 H_1 \\ V_2 H_2 \\ \cdots \\ V_K H_K \end{bmatrix}.$$

Performing a QR decomposition (QRD) of the effective DL channel matrix $H_{\mathit{eff}}$ with column pivoting comprises computing $H_{\mathit{eff}}^H E = QR$, where E is a permutation matrix. Computing Tomlinson Harashima precoder matrices comprises defining an (L×L) diagonal matrix J with (L−N) trailing zero diagonal entries as $J = \text{diag}(r_{11}^{-1}, \ldots, r_{NN}^{-1}, 0, \ldots, 0)$ where $r_{kk}$ denotes the $k^{th}$ diagonal element of the matrix R; computing $B = JR^H$, where the Tomlinson Harashima precoder includes an interference pre-cancellation block denoted by B−I, I denotes an identity matrix, and interference pre-cancellation matrix B has structure of a lower triangular matrix; and computing a transmit filter matrix $F = \Sigma^{1/2} Q^H$ for a transmit filter in the Tomlinson Harashima precoder, where $\Sigma$ is a diagonal matrix satisfying the power constraint: $\text{trace}(\Sigma) \leq P_t$. Calculating scalar weights for the UEs comprises defining a matrix G as $G = JE^H$; and determining the scalar weights $g_{ki}$ for the $i^{th}$ receive antenna of the $k^{th}$ UE as non-zero column entry of the $$\left( \sum_{m=1}^{m=k-1} r_m + i \right)^{th}$$

column of matrix G, where $r_m$ denotes a number of rows in the effective DL channel matrix for the $m^{th}$ UE, $\hat{H}_m$.

In specific embodiments, the DL channel matrix H is $H = [H_1^H, \ldots, H_K^H]^H$, and determining a receiver processing matrix $V_k$ for each of the K UEs comprises performing by the UEs SVD decomposition as $H_k = Y_k S_k W_k^H$, where matrix $Y_k$ denotes left singular vectors, $S_k$ denotes a diagonal matrix comprising singular values at main diagonal, and $W_k$ represents right singular vectors; and setting an estimated receiver processing matrix associated with the $k^{th}$ UE as $V_k = Y_k^H$. Computing an effective DL channel matrix $H_{\mathit{eff}}$ comprises computing by the UEs $$H_{\mathit{eff}} = \begin{bmatrix} \hat{H}_1^H \\ \hat{H}_2^H \\ \cdots \\ \hat{H}_K^H \end{bmatrix} = \begin{bmatrix} \hat{W}_1^H \\ \hat{W}_2^H \\ \cdots \\ \hat{W}_K^H \end{bmatrix},$$

where the matrix $\hat{W}_k$ is formed by selecting columns of $W_k$. The method further comprises informing the BS of the effective DL channel matrix $H_{\mathit{eff}}$ by the UEs. Performing a QR decomposition (QRD) of the effective DL channel matrix $H_{\mathit{eff}}$ with column pivoting comprises computing $H_{\mathit{eff}}^H = QR$.

Computing Tomlinson Harashima precoder matrices comprises defining an (L×L) diagonal matrix G with (L−N) trailing zero diagonal entries as $G = \text{diag}(r_{11}^{-1}, \ldots, r_{NN}^{-1}, 0, \ldots, 0)$, where $r_{kk}$ denotes the $k^{th}$ diagonal element of the matrix R; computing $B = GR^H$, where the Tomlinson Harashima precoder includes an interference pre-cancellation block denoted by B−I, I denotes an identity matrix, and interference pre-cancellation matrix B has structure of a lower triangular matrix; and computing a transmit filter matrix $F = \Sigma^{1/2} Q^H$ for a transmit filter in the Tomlinson Harashima precoder, where $\Sigma$ is a diagonal matrix satisfying the power constraint: $\text{trace}(\Sigma) \leq P_t$. Calculating scalar weights for the UEs comprises determining the scalar weights $g_{ki}$ for the $i^{th}$ receive antenna of the $k^{th}$ UE as non-zero column entry of the $$\left( \sum_{m=1}^{m=k-1} r_m + i \right)^{th}$$

diagonal element of matrix G, where $r_m$ denotes the number of rows in $\hat{H}_m$.

In some embodiments, processing user symbols by the Tomlinson Harashima precoder having the Tomlinson Harashima precoder matrices to produce an output of filtered vector symbols for the UEs comprises directing the user symbols through a modulo unit disposed in a feedforward path to produce the vector symbols which are fed back through an interference pre-cancellation block disposed in a feedback path, the interference pre-cancellation block being denoted by B−I, where B is an interference pre-cancellation matrix and I is an identity matrix; subtracting an output signal of the interference pre-cancellation block from the user symbols which are applied to the modulo unit in the feedforward path; and passing the vector symbols through a transmit filter represented by a transmit filter matrix F in the feedforward path to produce the output of filtered vector symbols from the BS.

In accordance with another aspect of the invention, a multi-user multiple-input multiple-output (MU-MIMO) wireless system comprises a base station (BS) having N antennas and $P_t$ as available transmit power; a plurality of K user terminals (UEs) which communicate with the base station via an uplink (UL) channel and a corresponding downlink (DL) channel, wherein the BS includes a Tomlinson Harashima precoder to process user symbols to produce an output of filtered vectors symbols for the UEs; and a channel, represented by a DL channel matrix of the DL channel through which communications occur in the wireless system with the user terminals, to receive the output of the Tomlinson Harashima precoder. The Tomlinson Harashima precoder includes an interference pre-cancellation matrix B for an interference pre-cancellation block and a transmit filter matrix F for a transmit filter which are computed by estimating a DL channel matrix $H_k$ for each of the K UEs; determining a receiver processing matrix $V_k$ for each of the K UEs; computing, based on the DL channel matrix $H_k$ and the receiver processing matrix $V_k$, an effective DL channel matrix $H_{\mathit{eff}}$; performing a QR decomposition (QRD) of the effective DL channel matrix $H_{\mathit{eff}}$ with column pivoting in which Q is a unitary matrix and R is an upper triangular matrix; and using the unitary matrix Q and the upper triangular matrix R to calculate B and F. The UEs are each configured to perform additional receiver processing on the transmitted signals at the UEs based on the receiver processing matrix $V_k$ and scale down the output of filtered vector symbols from the Tomlinson Haraschima precoder using scalar weights calculated based on the upper triangular matrix R.

In specific embodiments, the Tomlinson Haraschima precoder comprises a feedforward path; a feedback path; an interference pre-cancellation block denoted by B-I disposed in the feedback path, I being an identity matrix, B being an interference pre-cancellation matrix; a modulo unit disposed in the feedforward path to produce a stream of filtered vector symbols X which are fed back through the interference pre-cancellation block disposed in the feedback path, wherein an output signal of the interference pre-cancellation block is subtracted from a stream of user symbols and applied to the modulo unit in the feedforward path; and a transmit filter represented by the transmit filter matrix F for filtering the stream of filtered vector symbols X produced by the modulo unit disposed in the feedforward path.

These and other features and advantages of the present invention will become apparent to those of ordinary skill in the art in view of the following detailed description of the specific embodiments.

DETAILED DESCRIPTION OF THE INVENTION

Figure 1:
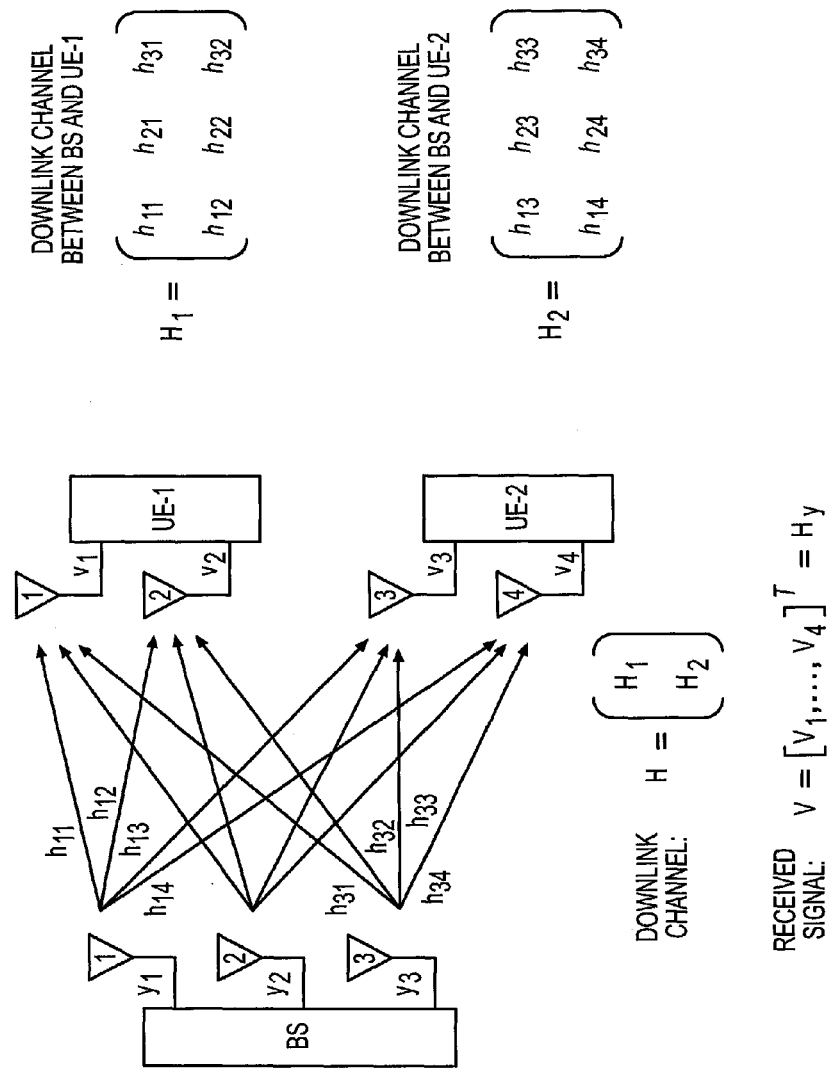
FIG. 1 is illustrates an example of a multi-user multiple-input multiple-output (MU-MIMO) wireless system showing a downlink channel representation of a multi-antenna base station (BS) and multiple user terminals (UEs) according to an embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for THP with additional receiver processing in MU-MIMO systems.

In the following, sub-section A presents the overall wireless transmission system in which the present invention can be applied. Sub-section B describes the system model implementing Tomlinson Harashima precoding (THP). Subsection C presents additional receiver processing for the THP, including an algorithm in subsection C.2 for transmitter and receiver processing assuming that full channel feedback is possible from UE to BS. Subsection C.3 relaxes that assumption and presents a different algorithm which reduces the feedback overhead.

A conventional THP precoder does not achieve Shannon's channel capacity. The first part of the present invention (subsection C.2) outlines a new algorithm for THP precoder which almost achieves Shannon's channel capacity for the broadcast channel. It requires the use of special receiver processing matrices at the user terminals. These receiver processing matrices are set as the eigenvectors of the optimal input covariance matrices of the respective equivalent uplink channels. By "optimal" we mean matrices that are better than merely arbitrary matrices; the matrices need not be the best possible matrices. These "optimal" input covariance matrices may be obtained using different approaches that are available. For example, Jindal et al. [3] outlines an iterative procedure to obtain input covariance matrices. Typically, one to three iterations are sufficient to produce a set of input covariance matrices at the desired level of throughput performance. The THP precoder is then implemented for the equivalent channel with receiver processing. More specifically, the first part (subsection C.2) improves the downlink (DL) or broadcast (BC) channel capacity of the existing THP precoder for networks deploying multi-antenna base stations (BS) by introducing receiver processing matrices $V_k$ for user equipment (UE) k for all users. Matrix $V_k$ for user k is unitary in nature and dependent on the overall channel matrix H (made of links from the BS and all UEs). In particular, each $V_k$ is extracted from the eigenvectors corresponding to the optimal Input Covariance Matrix) ($\Phi_k$) for the $k^{th}$ UE's equivalent Uplink (UL) channel assuming no information sharing among various UEs. The capacity achieved by the proposed THP precoder is dependent on the accuracy of computing $\Phi_k$ and can be improved by increasing the number of iterations required for this computation. The iterations here refer to the iterations for computing the input covariance matrices using the approach of Jindal et al. [3] as discussed above. Since $\Phi_k$ is computed iteratively, so is $V_k$ for all k UEs. One underlying assumption of the first part of the proposed invention is that the complete channel feedback is available for feedback purposes.

A conventional THP precoder requires full channel feedback from all the receivers to the transmitter. This causes significant overhead and can offset the throughput benefits. The second part (subsection C.3) of the present invention outlines a new algorithm for THP precoder which relaxes the requirement for full channel feedback. Instead, it relies on partial channel feedback and causes minimal loss in capacity. The second part of the invention also requires the use of special receiver processing matrices at the user terminals. These receiver processing matrices are derived from the left singular unitary matrix of the respective channel matrix. Whereas the right singular unitary matrices are feedback to the BS which then uses them as effective channel to implement THP. More specifically, the second part (subsection C.3) of the present invention describes the implementation of a THP precoder while avoiding full channel matrix feedback. As opposed to the convention approach where all UEs are required to feedback the respective channel matrices, the proposed methods requires UEs to send a subset of the column vectors belonging to the unitary matrices corresponding to the right singular vectors of their respective channel matrices. At the BS, a THP precoder can be realized by using the column vectors sent by different UEs. The amount of feedback from UE can be further reduced by using codebook approach wherein few bits can be used to convey the required information to the BS.

A. Wireless Transmission System

FIG. 1 illustrates an example of a multi-user multiple-input multiple-output (MU-MIMO) wireless system showing a downlink channel representation of a multi-antenna base station (BS) and multiple user terminals (UEs) according to an embodiment of the invention.

A.1 Channel Matrix Definition

The downlink channel between a BS and several UEs is normally represented as a matrix H whose number of rows equals to the sum of antennas at the UEs and number of columns is the same as the number of transmit antennas at the BS. The $(i,j)^{th}$ entry represents the complex channel gain $h_{ij}$ between the $i^{th}$ transmit antenna and $j^{th}$ receive antenna as shown in FIG. 1. In particular, complex channel gain $h_{ij}$ represents the amplification (or attenuation) that a transmitted signal undergoes in the wireless channel.

A.2 Channel Matrix Estimation

In a Frequency Division Duplex (FDD) system such as OFDMA, the complex channel gain $h_{ij}$ is usually estimated at the UE end. The channel estimation process is as follows. First, at the BS, antenna #1 transmits a reference signal. All the UEs estimate the received signal at each receiver antenna. As the reference signal is known to all UEs, the channel gain corresponding to the $1^{st}$ transmit antenna can be determined (assuming noise level is sufficiently below the reference signal power). This procedure is then repeated for transmit antennas number 2 to N.

In this way, the channel matrix $H_k$ corresponding to the $k^{th}$ UE can be estimated. Afterwards, all the UEs report back their respective channels to the BS using a dedicated feedback channel. The BS can then coalesce individual channel matrices to obtain the overall channel matrix H.

In Time Division Duplex (TDD) systems, the channel matrix can be estimated at the BS exploiting channel reciprocity property (i.e., UL and DL channels are related by some mathematical expression). For such systems, at a given time, one of the UEs will transmit a reference signal using a given antenna. This signal is captured by all the antennas at the BS and thus the corresponding channel gains are known. This process is repeated by all the UEs for all the available antennas, resulting in the estimate of complete Uplink channel matrix. The BS can then use some mathematical transformation (such as complex conjugation) to obtain equivalent downlink channel.

A.3 Information Flow from Base Station to User Terminals

Figure 2:
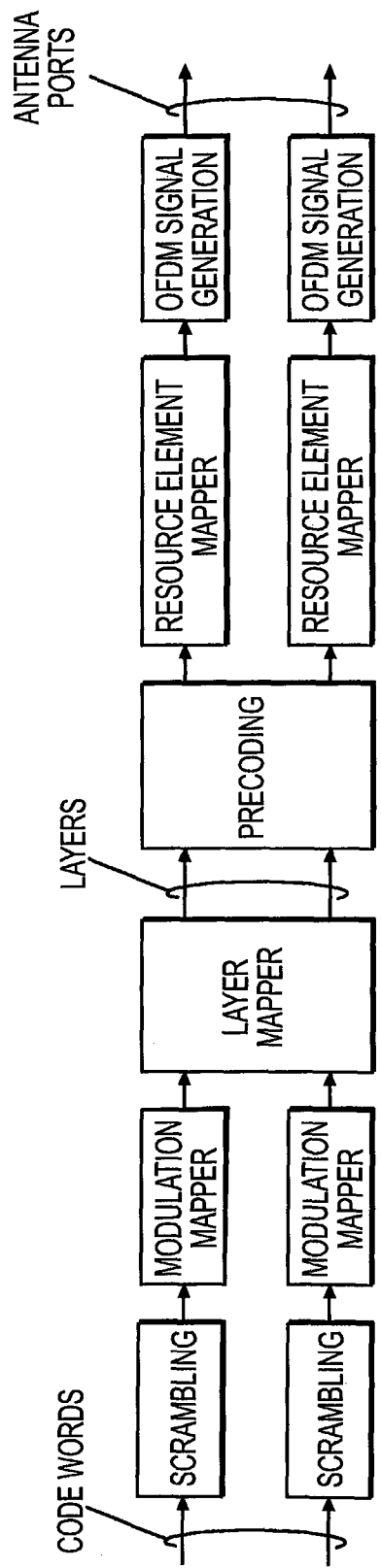
FIG. 2 illustrates an example of a communication block diagram for the downlink information flow at the base station of FIG. 2.

FIG. 2 illustrates an example of a communication block diagram for the downlink information flow at the base station of FIG. 1. The information to be sent to different UEs is represented by different codewords (one or more codewords can be assigned to a single UE). The bits in a given codeword are then scrambled using a predetermined scrambling code (Scrambling block) which is known both at the BS and UEs. The scrambled bits are then mapped (Modulation Mapper block) to a complex modulation symbol (e.g., BPSK, QPSK, QAM, etc.). These information symbols are then mapped (Layer Mapper block) to Layers (a stream of complex symbols) as shown in FIG. 2. The number of Layers is usually less than or equal to the rank of the channel matrix H. The information symbols mapped to different Layers are then processed in a Precoding block (which implements GDFE or THP etc). The precoded symbols are then mapped to resource elements within a Resource Element Mapper block (which is a rectangular grid of OFDM tones and time slots). These symbols are then fed to an OFDM Signal Generator and the output is mapped to the transmit antenna ports.

A.4 MIMO Precoders

Figure 3:
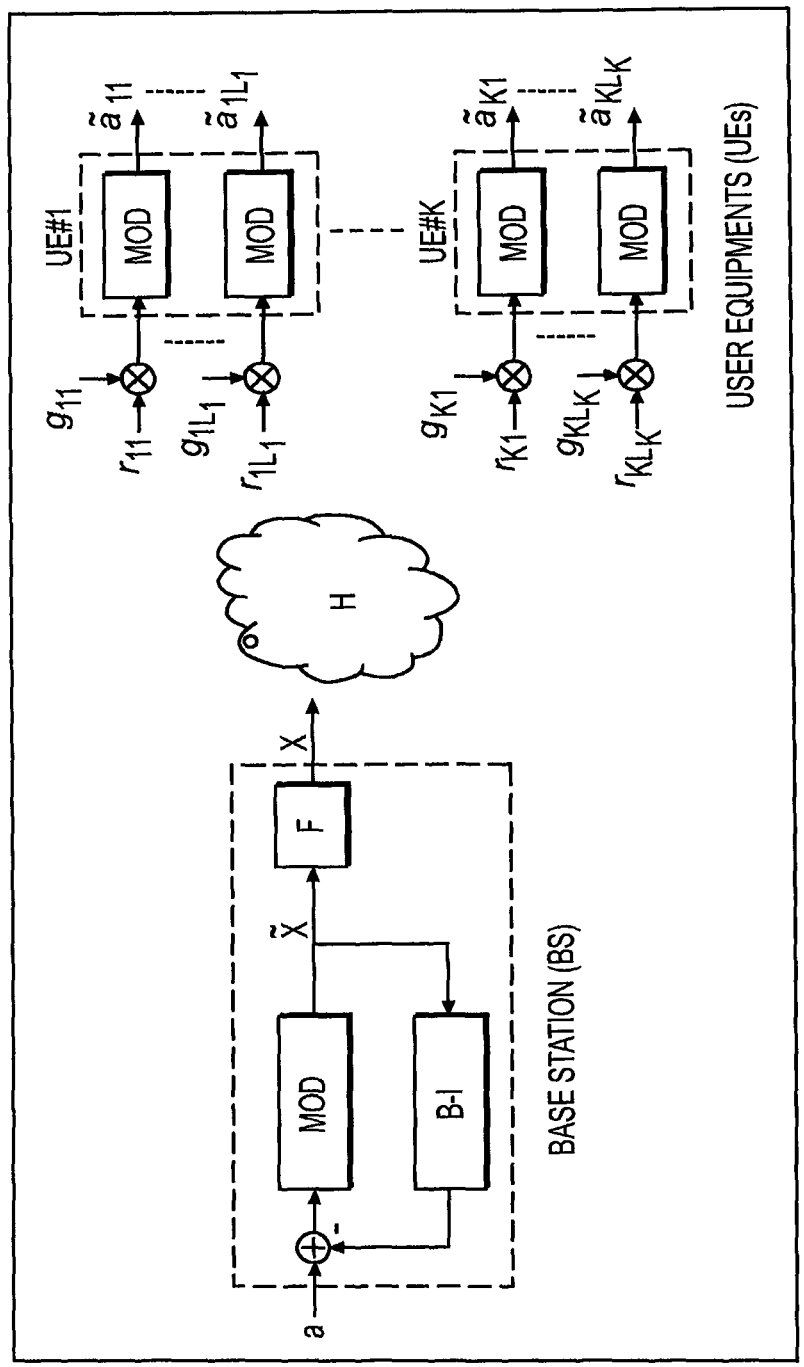
FIG. 3 illustrates an example of a block diagram for a known THP precoder.

There are several known precoding techniques which can enable a multi-antenna BS to send simultaneous data streams to multiple UEs in order to maximize the BC channel achievable rate. In $3^{rd}$ Generation Partnership Project; Technical Specification Group Radio Access Network, Evolved Universal Terrestrial Radio Access (E-UTRA), Physical Channels and Modulation (Release 8), 3GPP TS 36.211 V8.6.0 (2009-03) [4], a nonlinear precoding scheme known as Tomlinson-Harashima Precoding (THP) was proposed. The basic components of this scheme are shown in FIG. 3. The THP precoder consists of an interference pre-cancellation block (a triangular matrix B), which helps to ensure that the symbol vector encoded at the $k^{th}$ step will suffer interference from (k−1) symbol vectors only. A modulo operation is used to ensure that transmit power is not exceeded. Different from linear precoding techniques, THP triangularizes the effective channel matrix and provides higher system capacity. In general, THP provides close to optimal capacity for square channel matrices; however, for rectangular channel matrices (when the sum of the number of antennas of all UEs exceed that of the BS), the capacity loss is significant. Similar to linear precoding techniques, THP can also function with equal power allocation with some performance loss.

Wei Yu introduced the Generalized Decision Feedback Equalizer (GDFE) Precoder in "Capacity and Coding for Multi-Antenna Broadcast Channels", PhD Dissertation, Stanford University, February 2002. He showed that it achieved the BC channel capacity. In U.S. patent application Ser. Nos. 12/401,711 and 12/554,082, new GDFE algorithms were presented to reduce the computational complexity associated with the algorithm presented in Wei Yu's article. Similar to the article by Windpassinger et al. [1] referenced above, the algorithms in these two U.S. application publications rely on unequal power allocation to implement GDFE precoder. THP with receive beamforming has been considered in PCT/JP2008/069540, "Multiuser MIMO wireless communication method and wireless communication apparatus," filed Oct. 28, 2008 [5].

B. System Model for THP Precoding Using Interference Pre-Cancellation

Figure 4:
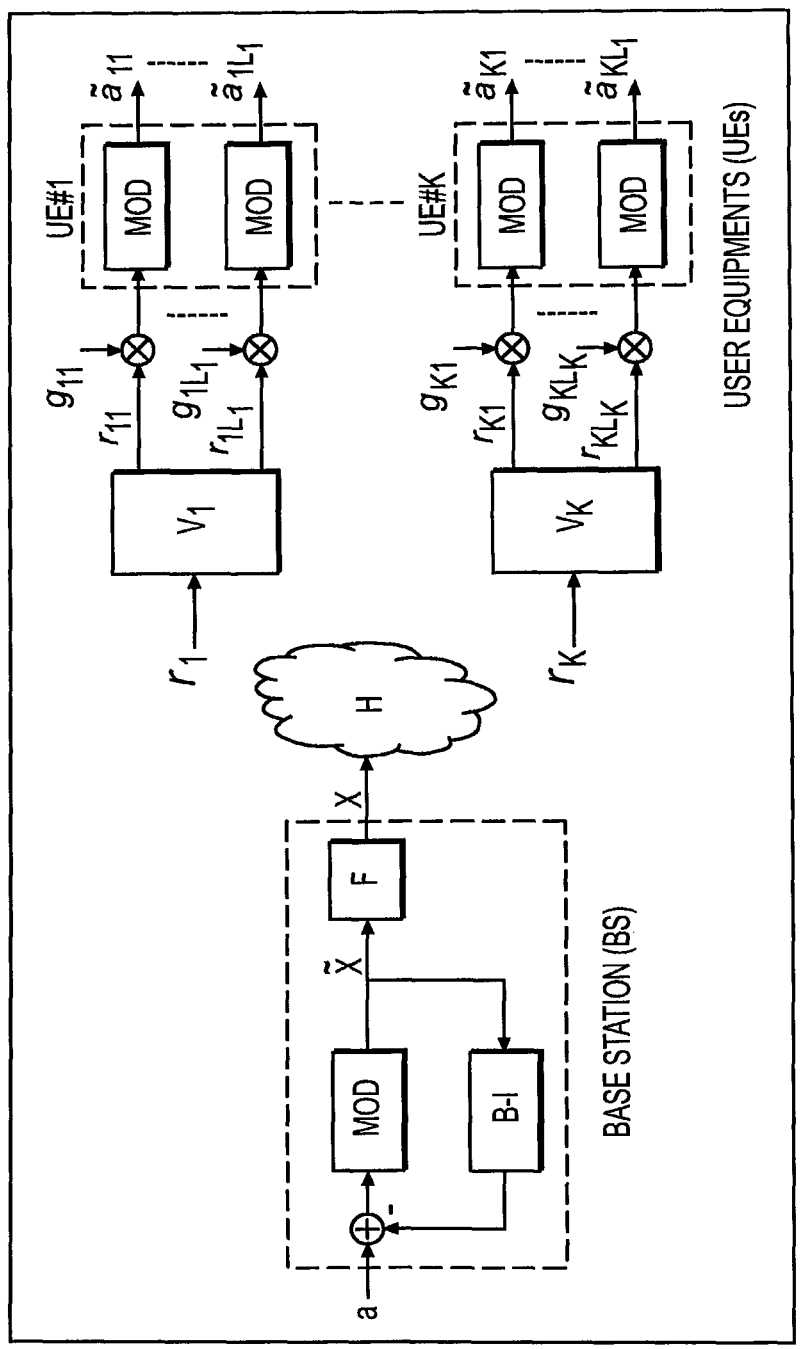
FIG. 4 illustrates an example of a block diagram for a THP precoder according to an embodiment of the present invention.

FIG. 4 illustrates an example of a block diagram for a THP precoder according to an embodiment of the present invention.

First, the system model and notations used herein are set forth. Let the BS have N antennas and let there be K UEs with $L_k$ antennas on the $k^{th}$ UE. The sum of antennas at all UEs is denoted as $L=\Sigma_{k=1}^{K} L_k$. Let $H_k$ denote the channel gain matrix of dimensions $\{L_k \times N\}$ between the BS and the $k^{th}$ UE. The combined channel gain matrix between the BS and the K UEs is of dimension $\{L \times N\}$ and is given by $H=[H_1^T H_2^T \ldots H_K^T]^T$, where the superscript $^T$ denotes the matrix transpose.

Let $a_k$ denote the input symbol vector destined for the $k^{th}$ UE, so that the stacked input vector can be represented as $a=[a_1^T a_2^T \ldots a_K^T]^T$. The length of a is assumed not to exceed the number of antennas at the BS. Also, assume the additional constraint that $S_{aa}=E[aa^H]=I$, where $E[.]$ indicates the time average of its argument, the superscript H denotes the conjugate transpose and I denotes the identity matrix.

As shown in FIG. 4, the THP precoder includes an interference pre-cancellation block denoted by B−I, where B has the structure of a Lower Triangular matrix. The functionality of this block is the same as described in Windpassinger et al. [1], i.e., the symbols in vector a encoded at the $k^{th}$ step will suffer interference from (k−1) symbols only. Similar to the description in [1], a modulo operation is used to limit the total transmit power of the vector $\tilde{x}$ obtained after interference pre-cancellation stage. The vector $\tilde{x}$ is then passed through a transmit filter F to yield a vector x, which is mapped to the transmit antenna elements of the Base Station for transmission. In particular, $F=M\Sigma^{1/2}$ where M is a unitary matrix and $\Sigma$ is a diagonal matrix satisfying the power constraint: trace $(\Sigma) \leq P_t$. Here, $P_t$ denotes the total available transmit power and trace(.) indicates the sum of diagonal elements of the matrix argument. At the receiving end, the UE scales down the received baseband signal using a scalar quantity ($g_{ki}$) followed by the modulo operation to remap the received signal to the original constellation points. The details of this operation can be found in Windpassinger et al. [1].

C. Computation of THP Precoder Matrices

C.1 Channel Estimation

Each UE will determine the corresponding DL channel associated with the BS. Let $H_k$ denote the estimated DL channel matrix for the $k^{th}$ UE. As mentioned in Section B, the overall channel matrix H is $$H=[H_1^H, \ldots, H_K^H]^H \quad (1)$$

C.2 Computation of Receiver Processing Matrices Assuming Full Channel Feedback from UE to BS Next, the BS will determine the optimal input covariance matrices $\Phi_k$ for the corresponding UL channel $H_k^H$ for the $k^{th}$ UE. As discussed above, the matrices need not be optimal; for practical purposes, one or two iterations using the algorithm of Jindal et al. [3] would typically be sufficient. To elaborate this further, the BS will consider a scenario where all UEs were involved in UL transmission to the BS and none of the UEs shares its transmitted data with the other UEs. In mathematical terms, if $u=[u_1^H u_2^H \ldots u_k^H]^H$ denotes the joint transmit vector for all UEs then the associated input covariance matrix is defined as:

$$\Phi_k=E[u_k u_k^H] \quad (2)$$

Also, it is assumed that the total transmit power used by all UEs will not exceed the available transmit power at the BS for the original downlink transmission.

$$\sum_{k=1}^{K} \text{trace}(\Phi_k) \leq P_t \quad (3)$$

To achieve optimal capacity for the equivalent UL channel, these matrices are usually computed jointly as all of them depend on H. One can use the approaches in Jindal et al. [3] or Ser. No. 12/554,069 to compute these matrices.

Next, the BS will determine the eigenvectors associated $U_k$ with each $\Phi_k$ as $$\Phi_k=U_k \Gamma_k U_k^H \quad (4)$$

where $U_k$ is a unitary matrix consisting of the eigenvectors and $\Gamma_k$ is a diagonal matrix consisting of the eigen values, and set the receiver processing matrix $V_k$ associated with $k^{th}$ UE as $$V_k=U_k^H \quad (5)$$

Next, the BS will send these receiver processing matrices to the respective UEs either explicitly or via a codebook method similar to the ones mentioned in 3GPP TS 36.211 V8.6.0 (2009-03) [4], at Section 6.3.4.2.3.

C.2.1 Computation of THP Precoder Matrices

Next, the BS will compute the matrices {B, F} in the following manner:

a) Obtain effective DL channel matrix as $$H_{eff} = \begin{bmatrix} \hat{H}_1 \\ \hat{H}_2 \\ \ldots \\ \hat{H}_K \end{bmatrix} = \begin{bmatrix} V_1 H_1 \\ V_2 H_2 \\ \ldots \\ V_K H_K \end{bmatrix} \quad (6)$$

b) Compute QR decomposition of the matrix $H_{eff}^H$ with column pivoting so that:

$$H_{eff}^H E = QR \quad (7)$$

where E is a permutation matrix, Q is a unitary matrix, and R is an upper triangular matrix. Column pivoting ensures that the diagonal entries of R are in decreasing order of magnitude. One can use the MATLAB® software's 'qr' function to compute the matrices E, Q and R with following command [Q, R, E]=qr ($H_{eff}^H$).

c) Compute THP precoder matrices. First, define an (L×L) diagonal matrix J with (L-N) trailing zero diagonal entries as:

$$J = \text{diag}(r_{11}^{-1}, \ldots, r_{NN}^{-1}, 0, \ldots, 0) \quad (8)$$

where $r_{kk}$ denotes the $k^{th}$ diagonal element of the matrix R. Next, compute the THP matrices as:

$$B = JR^H \quad (9)$$

$$F = \Sigma^{1/2} Q^H \quad (10)$$

For equal power allocation, one can set $$\Sigma = \frac{P_t}{N} I.$$

For optimal capacity, we need to perform water-filing to ensure the strongest channel modes (represented by the diagonals of matrix F) are allocated more power. This can be achieved by performing water-filing over the squared diagonal entries of matrix F.

C.2.2 Computation of Scalar Weights for User Terminals

Define the matrix G as $$G = JE^H \quad (11)$$

Now, the BS can determine the scalar weights $g_{ki}$ for the $i^{th}$ receive antenna of the $k^{th}$ UE as largest column element of the $$\left( \sum_{m=1}^{m=k-1} r_m + i \right)^{th}$$

column of matrix G, where $r_m$ denotes the number of rows in the effective DL channel matrix $\hat{H}_m$ for the $m^{th}$ UE (which is the same as the number of antennas at the $m^{th}$ UE).

Figure 5:
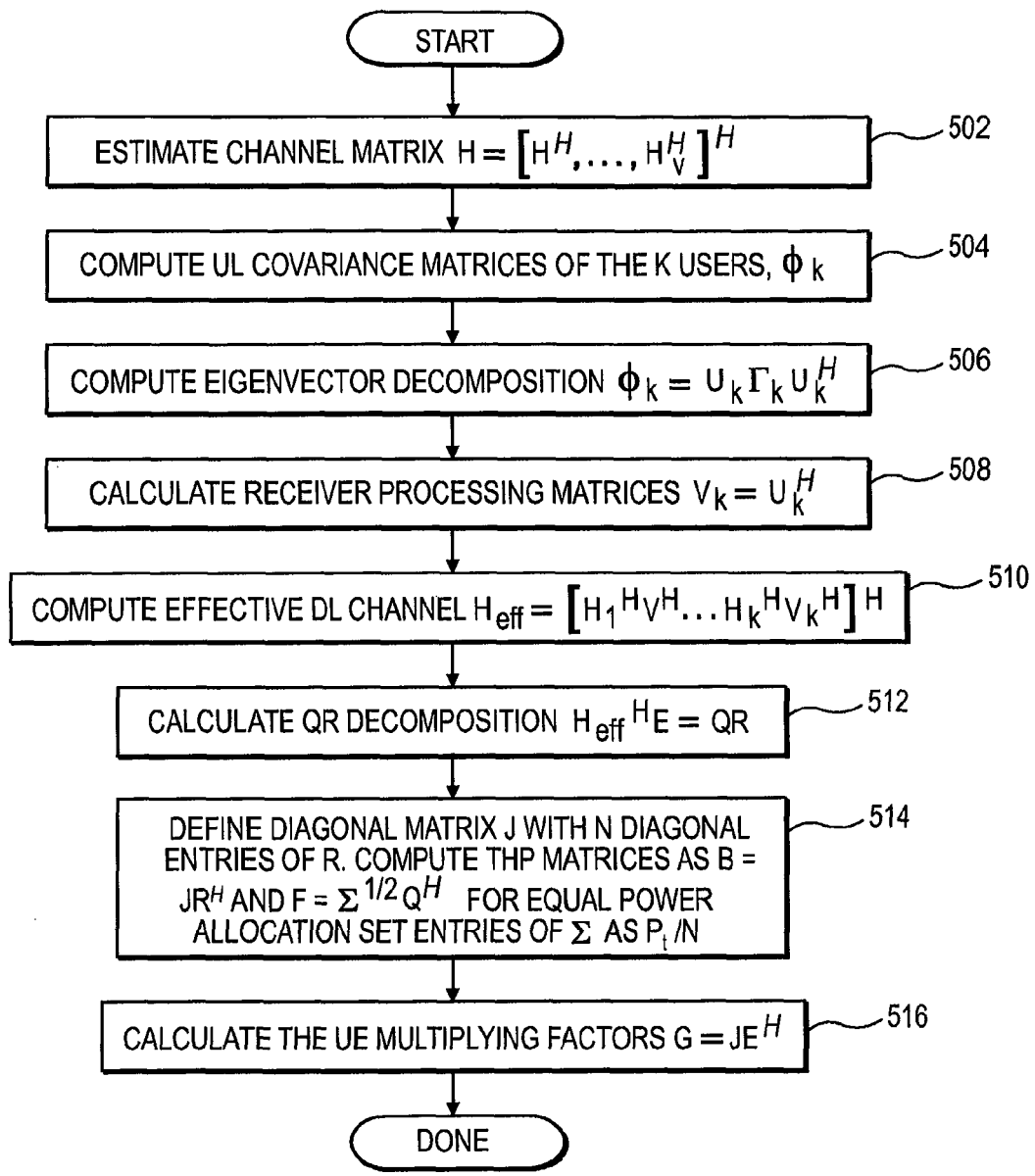
FIG. 5 is a flow diagram for computing the input covariance matrix for the UL channel according to embodiments of the present invention.

FIG. 5 shows an example of a flow diagram illustrating the sequence of computations required to implement the proposed THP method assuming full channel feedback from user terminal to base station. In step 502, the method estimates the channel matrix H=[$H_1^H, \ldots, H_K^H$]$^H$ as presented in Equation (1). In step 504, the method computes the UL covariance matrices of the K users, $\Phi_k$ according to Equation (2). In step 506, the method computes the eigenvector decomposition $\Phi_k = U_k \Gamma_k U_k^H$ according to Equation (4). In step 508, the method calculates the receiver processing matrices $V_k = U_k^H$ according to Equation (5). In step 510, the method computes the effective DL channel matrix $H_{eff} = [H_1^H V_1^H \ldots H_K^H V_K^H]^H$ according to Equation (6). In step 512, the method calculates the QR decomposition $H_{eff}^H E = QR$ according to Equation (7). In step 514, the method defines the diagonal matrix J with N diagonal entries of R, and computes the THP matrices as $B = JR^H$ according to Equation (9) and $F = \Sigma^{1/2} Q^H$ according to Equation (10). For equal power allocation, the method sets entries of $\Sigma$ as $P_t/N$. In step 516, the method calculates the UE multiplying factors $G = JE^H$ according to Equation (11).

C.2.3 Numerical Example

The following numerical example illustrates the computation of various matrices involved in the proposed design of the THP precoder. Consider a BS with 2 antennas and 2 UEs with 2 antennas each, so that the channel matrices associated with both the users are of dimension 2×2 as shown in (12). The transmit power is assumed to be 40. For the sake of simplicity, we consider a real channel as below (step 502):

$$H = \begin{bmatrix} H_1 \\ H_2 \end{bmatrix} = \begin{bmatrix} -0.5993 & 0.2838 \\ -0.7924 & 0.8682 \\ 0.5262 & 0.2628 \\ -1.3123 & -0.3376 \end{bmatrix} \quad (12)$$

Next, we use the algorithm in Jindal et al. [3] to compute the Input Covariance Matrices for the equivalent Uplink channels $H_1^H$ and $H_2^H$. These matrices are computed using two iterations of the algorithm in [3] (step 504).

$$\Phi_1 = \begin{bmatrix} 2.9998 & 7.1275 \\ 7.1275 & 16.9347 \end{bmatrix} \quad (13)$$

$$\Phi_2 = \begin{bmatrix} 3.7786 & -7.8449 \\ -7.8449 & 16.2869 \end{bmatrix} \quad (14)$$

Now, we perform the Eigen value decomposition (EVD) as $\Phi_k = U_k \Gamma_k U_k^H$ (step 506) and obtain the following receiver processing matrices for the two UEs (step 508).

$$V_1 = U_1^H = \begin{bmatrix} -0.9217 & 0.3879 \\ 0.3879 & 0.9217 \end{bmatrix} \quad (15)$$

$$V_2 = U_2^H = \begin{bmatrix} -0.9009 & -0.4340 \\ -0.4340 & 0.9009 \end{bmatrix} \quad (16)$$

The effective DL channel matrix can now be computed as (step 510):

$$H_{eff} = \begin{bmatrix} V_1 H_1 \\ V_1 H_2 \end{bmatrix} = \begin{bmatrix} 0.2450 & 0.0752 \\ -0.9628 & 0.9103 \\ 0.0954 & -0.0903 \\ -1.4106 & -0.4182 \end{bmatrix} \quad (17)$$

Next, we perform the QR decomposition of $H_{eff}^H$ with column pivoting using the MATLAB® command [Q, R, E]=qr ($H_{eff}^H$) and obtain the following matrices (step 512):

$$Q = \begin{bmatrix} -0.9588 & -0.2842 \\ -0.2842 & 0.9588 \end{bmatrix} \quad (18)$$

$$R = \begin{bmatrix} 1.4713 & 0.6644 & -0.0658 & -0.2563 \\ 0 & 1.1464 & -0.1137 & 0.0025 \end{bmatrix} \quad (19)$$

$$E = \begin{bmatrix} 0 & 0 & 0 & 1 \\ 0 & 1 & 0 & 0 \\ 0 & 0 & 1 & 0 \\ 1 & 0 & 0 & 0 \end{bmatrix} \quad (20)$$

The matrices in (18)-(20) are then used to compute the following matrices (step 514):

$$J = \text{diag}(r_{11}^{-1}, r_{22}^{-1}, 0, 0) = \begin{bmatrix} 0.6797 & 0 \\ 0 & 0.8723 \\ 0 & 0 \\ 0 & 0 \end{bmatrix} \quad (21)$$

$$B = JR^H = \begin{bmatrix} 1 & 0 \\ 0.5795 & 1 \\ 0 & 0 \\ 0 & 0 \end{bmatrix} \quad (22)$$

The last two zero rows in interference pre-cancellation matrix B indicate that the BS can transmit only two symbols. Thus, we use sub-matrix formed by first two rows of B to perform interference pre-cancellation. The transmit filter F can be compute assuming equal power allocation (i.e., $\Sigma = (40/2)I_2$) as $$F = \Sigma^{\frac{1}{2}} Q^H = \begin{bmatrix} -4.2877 & -1.2711 \\ -1.2711 & 4.2877 \end{bmatrix} \quad (23)$$

Finally, the scalar weights used at the UEs after receive filtering can be determined by first computing the matrix G as (step 516):

$$G = JE^H = \begin{bmatrix} 0 & 0 & 0 & 0.6797 \\ 0 & 0.8723 & 0 & 0 \\ 0 & 0 & 0 & 0 \\ 0 & 0 & 0 & 0 \end{bmatrix} \quad (24)$$

and then setting the scalar weights as $g_{11}=0$, $g_{12}=0.8723$, $g_{21}=0$, and $g_{22}=0.6797$.

C.3 Reduced Feedback Overhead Algorithm: How to Compute Transmitter/Receiver Processing Matrices Each UE will perform the following SVD decomposition as:

$$H_k = Y_k S_k W_k^H \quad (25)$$

where the matrix $Y_k$ denotes the left singular vectors, $S_k$ denotes the diagonal matrix comprising the singular values at the main diagonal, and $W_k$ represents the right singular vectors. It is proposed that the SVD decomposition be performed in such a way that diagonal entries of $S_k$ are all non-zeros (for example, this can be achieved by using the MATLAB software function "svd" with 'econ' option).

It is proposed that the UE employ $V_k = Y_K^H$ for receiver processing (as shown in FIG. 4) and inform the BS of the following estimated channel:

$$\hat{H}_k = \hat{W}_k^H \quad (26)$$

where the matrix $\hat{W}_k$ is formed by selecting columns of $W_k$ (it is also possible to set $\hat{W}_k = W_k$). The number of columns in $\hat{W}_k$ will indicate the maximum number of spatial streams that can be sent to the $k^{th}$ UE by the BS. This can be decided by the UE alone or by the BS. The UE will send $\hat{W}_k^H$ matrices to the BS either explicitly or via a codebook method similar to the ones mentioned in 3GPP TS 36.211 V8.6.0 [4], at Section 6.3.4.2.3.

C.3.1 Computation of THP Precoder Matrices

Next, the BS will compute the matrices {B, F} in the following manner:

a) Obtain effective DL channel matrix as $$H_{\text{eff}} = \begin{bmatrix} \hat{H}_1 \\ \hat{H}_2 \\ \dots \\ \hat{H}_K \end{bmatrix} = \begin{bmatrix} \hat{W}_1^H \\ \hat{W}_2^H \\ \dots \\ \hat{W}_K^H \end{bmatrix} \quad (27)$$

b) Compute QR decomposition of the matrix $H_{\text{eff}}^H$ as:

$$H_{\text{eff}}^H = QR \quad (28)$$

where Q is a unitary matrix and R is an upper triangular matrix.

c) Compute THP precoder matrices. First, define an (L×L) diagonal matrix G with (L-N) trailing zero diagonal entries as:

$$G = \text{diag}(r_{11}^{-1}, \dots, r_{NN}^{-1}, 0, \dots, 0) \quad (29)$$

where $r_{kk}$ denotes the $k^{th}$ diagonal element of the matrix R.

Next, compute the THP matrices as:

$$B = GR^H \quad (30)$$

$$F = \Sigma^{1/2} Q^H \quad (31)$$

For equal power allocation, one can set $$\Sigma = \frac{P_t}{N} I.$$

C.3.2 Computation of Scalar Weights for User Terminals

Now, the BS can choose the scalar weights $g_{ki}$ for the $i^{th}$ receive antenna of the $k^{th}$ UE as the $$\left( \sum_{m=1}^{m=k-1} r_m + i \right)^{th}$$

diagonal element of matrix G. Here $r_m$ denotes the number of rows in $\hat{H}_m$ (which is less than of equal to the number of antennas at the $m_{th}$ UE).

Figure 6:
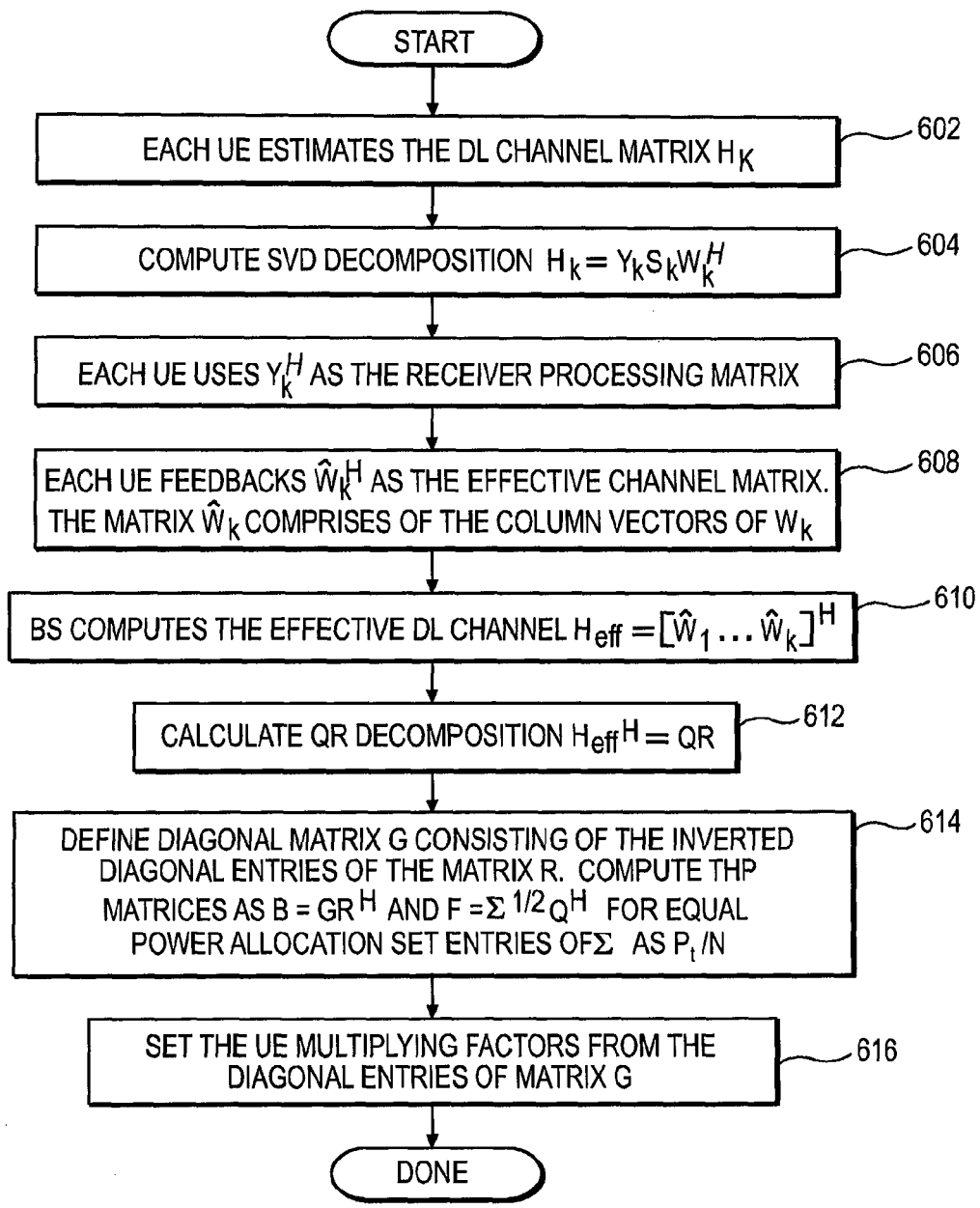
FIG. 6 is a flow diagram for computing the input covariance matrix for the DL channel.

FIG. 6 shows an example of a flow diagram illustrating the sequence of computations required to implement the proposed THP method using a reduced feedback overhead algorithm. In step 602, each UE estimates the DL channel matrix $H_k$. In step 604, the method computes SVD decomposition $H_k = Y_k S_k W_k^H$ according to Equation (25). In step 606, each UE uses $Y_k^H$ as the receiver processing matrix. In step 608, each UE feedbacks $\hat{W}_k^H$ as the effective channel matrix according to Equation (26). The matrix $\hat{W}_k$ is comprised of the column vectors of $W_k$. In step 610, the BS computes the effective DL channel matrix $H_{\textit{eff}}=[\hat{W}_1 \ldots \hat{W}_K]^H$ according to Equation (27). In step 612, the method calculates the QR decomposition $H_{\textit{eff}}{}^H=QR$ according to Equation (28). In step 614, the method defines the diagonal matrix G consisting of the inverted diagonal entries of the matrix R, and computes the THP matrices as $B=GR^H$ according to Equation (30) and $F=\Sigma^{1/2}Q^H$ according to Equation (31). For equal power allocation, the method sets the entries of $\Sigma$ as $P_t/N$. In step 616, the method sets the UE multiplying factors from the diagonal entries of matrix G.

This invention is an improvement on the existing THP precoder technique for MU-MIMO networks. The first proposed algorithm (FIG. 5) is ideal for achieving performance close to Shannon's capacity with much reduced computational complexity and feedback overhead as compared to the GDFE precoder. The second proposed algorithm (FIG. 6) is an improvement on the existing THP precoder technique as it relaxes the requirement of full channel feedback from the UE to the BS. A key advantage of the first algorithm is that it requires the same feedback overhead as multi-user beamforming technique (a linear precoding method) while maintaining the throughput advantages of the THP scheme. It has good potential for LTE-A standardization activity. A key advantage of the second algorithm is that it improves the well-known THP precoder to almost achieve Shannon's channel capacity without any significant increase in computational complexity.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for Tomlinson Harashima precoding (THP) with additional receiver processing in MU-MIMO systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for processing user symbols with a Tomlinson Harashima precoder in a base station (BS) of a multi-user multiple-input multiple-output (MU-MIMO) wireless system having K user terminals (UEs) which communicate with the base station via an uplink (UL) channel and a corresponding downlink (DL) channel, the base station having N antennas and $P_t$ as available transmit power, the method comprising:

estimating a DL channel matrix $H_k$ for each of the K UEs;

determining a receiver processing matrix $V_k$ for each of the K UEs;

computing, based on the DL channel matrix $H_k$ and the receiver processing matrix $V_k$, an effective matrix DL channel $H_{\textit{eff}}$;

performing a QR decomposition (QRD) of the effective DL channel matrix $H_{\textit{eff}}$ with column pivoting in which Q is a unitary matrix and R is an upper triangular matrix;

computing Tomlinson Harashima precoder matrices using the unitary matrix Q and the upper triangular matrix R;

calculating scalar weights for the UEs using the upper triangular matrix R;

processing user symbols by the Tomlinson Harashima precoder having the Tomlinson Harashima precoder matrices to produce an output of filtered vector symbols for the UEs;

directing the output of the Tomlinson Harashima precoder to the channel represented by the DL channel matrix through which communications occur in the wireless system with the user terminals;

providing the receiver processing matrix $V_k$ to the UEs to be used for performing additional receiver processing on the transmitted signals at the UEs for each of the K UEs; and providing the scalar weights to the UEs to be used on the transmitted signals at the UEs.

2. The method of claim 1, wherein the DL channel matrix H is $H=[H_1^H, \ldots, H_K^H]^H$, and wherein determining the receiver processing matrix $V_k$ for each of the K UEs comprises:

determining by the BS an input covariance matrices $\Phi_k$ for a corresponding UL channel $H_k^H$ for the $k^{th}$ UE, for each of the K UEs, $\Phi_k=E[u_k u_k^H]$, where $u=[u_1^H u_2^H \ldots u_K^H]^H$ denotes a joint transmit vector for all UEs, and $E[.]$ indicates time average of its argument, wherein a total transmit power used by all UEs will not exceed the available transmit power $P_t$ at the BS for original downlink transmission, $$\sum_{k=1}^{K} \text{trace}(\Phi_k) \leq P_t$$

and wherein trace(.) indicates a sum of diagonal elements of matrix argument;

determining eigenvectors associated $U_k$ with each $\Phi_k$ as $$\Phi_k = U_k \Gamma_k U_k^H; \text{ and}$$

setting the receiver processing matrix $V_k$ associated with the $k^{th}$ UE as $$V_k = U_k^H.$$

3. The method of claim 2, wherein computing the effective DL channel matrix $H_{\textit{eff}}$ comprises:

computing by the BS $$H_{\textit{eff}} = \begin{bmatrix} H_1 \\ H_2 \\ \cdots \\ H_K \end{bmatrix} = \begin{bmatrix} V_1 H_1 \\ V_2 H_2 \\ \cdots \\ V_K H_K \end{bmatrix}.$$

4. The method of claim 3, wherein performing the QR decomposition (QRD) of the effective DL channel matrix $H_{\textit{eff}}$ with column pivoting comprises:

computing $H_{\textit{eff}}^H E = QR$, where E is a permutation matrix.

5. The method of claim 4, wherein computing the Tomlinson Harashima precoder matrices comprises:

defining an (L×L) diagonal matrix J with (L-N) trailing zero diagonal entries as $J = \text{diag}(r_{11}^{-1}, \ldots, r_{NN}^{-1}, 0, \ldots, 0)$, where $r_{kk}$ denotes the $k^{th}$ diagonal element of the matrix R;

computing $B = JR^H$, where the Tomlinson Harashima precoder includes an interference pre-cancellation block denoted by B-I, I denotes an identity matrix, and interference pre-cancellation matrix B has structure of a lower triangular matrix; and computing a transmit filter matrix $F = \Sigma^{1/2} Q^H$ for a transmit filter in the Tomlinson Harashima precoder, where $\Sigma$ is a diagonal matrix satisfying the power constraint: trace $(\Sigma) \leq P_t$.

6. The method of claim 5, wherein calculating the scalar weights for the UEs comprises:

defining a matrix G as $G = JE^H$; and determining the scalar weights $g_{ki}$ for the $i^{th}$ receive antenna of the $k^{th}$ UE as non-zero column entry of the $$\left( \sum_{m=1}^{m=k-1} r_m + i \right)^{th}$$

column of matrix G, where $r_m$ denotes a number of rows in the effective DL channel matrix for the $m^{th}$ UE, $H_m$.

7. The method of claim 1, wherein the DL channel matrix H is $H = [H_1^H, \ldots, H_K^H]^H$, and wherein determining the receiver processing matrix $V_k$ for each of the K UEs comprises:

performing by the UEs SVD decomposition as $H_k = Y_k S_k W_k^H$, where matrix $Y_k$ denotes left singular vectors, $S_k$ denotes a diagonal matrix comprising singular values at main diagonal, and $W_k$ represents right singular vectors; and setting the estimated receiver processing matrix associated with the $k^{th}$ UE as $V_k = Y_k^H$.

8. The method of claim 7, wherein computing the effective DL channel matrix $H_{\textit{eff}}$ comprises:

computing by the UEs $$H_{\textit{eff}} = \begin{bmatrix} H_1^H \\ H_2^H \\ \cdots \\ H_K^H \end{bmatrix} = \begin{bmatrix} W_1^H \\ W_2^H \\ \cdots \\ W_K^H \end{bmatrix},$$

where the matrix $W_k$ is formed by selecting columns of $W_k$;

wherein the method further comprises informing the BS of the effective DL channel matrix $H_{\textit{eff}}$ by the UEs.

9. The method of claim 8, wherein performing the QR decomposition (QRD) of the effective DL channel matrix $H_{\textit{eff}}$ with column pivoting comprises:

computing $H_{\textit{eff}}^H = QR$.

10. The method of claim 9, wherein computing the Tomlinson Harashima precoder matrices comprises:

defining an (L×L) diagonal matrix G with (L-N) trailing zero diagonal entries as $G = \text{diag}(r_{11}^{-1}, \ldots, r_{NN}^{-1}, 0, \ldots, 0)$, where $r_{kk}$ denotes the $k^{th}$ diagonal element of the matrix R;

computing $B = GR^H$, where the Tomlinson Harashima precoder includes an interference pre-cancellation block denoted by B-I, I denotes an identity matrix, and interference pre-cancellation matrix B has structure of a lower triangular matrix; and computing a transmit filter matrix $F = \Sigma^{1/2} Q^H$ for a transmit filter in the Tomlinson Harashima precoder, where $\Sigma$ is a diagonal matrix satisfying the power constraint: trace $(\Sigma) \leq P_t$, wherein trace(.) indicates a sum of diagonal elements of matrix argument.

11. The method of claim 10, wherein calculating the scalar weights for the UEs comprises:

determining the scalar weights $g_{ki}$ for the $i^{th}$ receive antenna of the $k^{th}$ UE as non-zero column entry of the $$\left( \sum_{m=1}^{m=k-1} r_m + i \right)^{th}$$

diagonal element of matrix G, where $r_m$ denotes the number of rows in $H_m$.

12. The method of claim 1, wherein processing the user symbols by the Tomlinson Harashima precoder having the Tomlinson Harashima precoder matrices to produce the output of filtered vector symbols for the UEs comprises:

directing the user symbols through a modulo unit disposed in a feedforward path to produce the vector symbols which are fed back through an interference pre-cancellation block disposed in a feedback path, the interference pre-cancellation block being denoted by B-I, where B is an interference pre-cancellation matrix and I is an identity matrix;

subtracting an output signal of the interference pre-cancellation block from the user symbols which are applied to the modulo unit in the feedforward path; and passing the vector symbols through a transmit filter represented by a transmit filter matrix F in the feedforward path to produce the output of filtered vector symbols from the BS.

13. A base station (BS) in a multi-user multiple-input multiple-output (MU-MIMO) wireless system which also includes a plurality of K user terminals (UEs) which communicate with the base station via an uplink (UL) channel and a corresponding downlink (DL) channel, and a DL channel matrix representing the DL channel through which communications occur in the wireless system with the user terminals, the BS comprising:

N antennas and $P_t$ as available transmit power; and a Tomlinson Harashima precoder configured to process user symbols to produce an output of filtered vectors symbols for the UEs, which is to be transmitted to the channel;

wherein the Tomlinson Harashima precoder includes an interference pre-cancellation matrix B for an interference pre-cancellation block and a transmit filter matrix F for a transmit filter, and the Tomlinson Harashima precoder is configured to estimate a DL channel matrix $H_k$ for each of the K UEs; determine a receiver processing matrix $V_k$ for each of the K UEs; compute, based on the DL channel matrix $H_k$ and the receiver processing matrix $V_k$, an effective DL channel matrix $H_{eff}$; perform a QR decomposition (QRD) of the effective DL channel matrix $H_{eff}$, with column pivoting in which Q is a unitary matrix and R is an upper triangular matrix; and use the unitary matrix Q and the upper triangular matrix R to calculate B and F; and wherein the receiver processing matrix $V_k$ is provided to the UEs by the BS to be used for performing additional receiver processing on the transmitted signals at the UEs, and scalar weights calculated based on the upper triangular matrix R are provided to the UEs for scaling down the output of filtered vector symbols from the Tomlinson Harashima precoder.

14. The base station according to claim 13, wherein the DL channel matrix H is $H=[H_1^H, \ldots, H_k^H]^H$, and wherein determining the receiver processing matrix $V_k$ for each of the K UEs comprises:

determining an input covariance matrices $\Phi_k$ for a corresponding UL channel $H_k^H$ for the $k^{th}$ UE, for each of the K UEs, $\Phi_k=E[u_k u_k^H]$, where $u=[u_1^H u_2^H \ldots u_K^H]^H$ denotes a joint transmit vector for all UEs, and E[.] indicates time average of its argument wherein a total transmit power used by all UEs will not exceed the available transmit power $P_t$ at the BS for original downlink transmission, $$\sum_{k=1}^{K} \text{trace}(\Phi_k) \leq P_t$$

and wherein trace(.) indicates a sum of diagonal elements of matrix argument;

determining eigenvectors associated $U_k$ with each $\Phi_k$ as $\Phi_k = U_k \Gamma_k U_k^H$; and setting the receiver processing matrix $V_k$ associated with the $k^{th}$ UE as $V_k = u_k^H$.

15. The base station according to claim 14, wherein computing the effective DL channel matrix $H_{eff}$ comprises computing by the BS $$H_{eff} = \begin{bmatrix} H_1 \\ H_2 \\ \ldots \\ H_K \end{bmatrix} = \begin{bmatrix} V_1 H_1 \\ V_2 H_2 \\ \ldots \\ V_K H_K \end{bmatrix};$$

wherein performing the QR decomposition (QRD) of the effective DL channel matrix $H_{eff}$ with column pivoting comprises computing $H_{eff}^H E = QR$, where E is a permutation matrix; and wherein using the unitary matrix Q and the upper triangular matrix R to calculate B and F comprises:

defining an (L×L) diagonal matrix J with (L-N) trailing zero diagonal entries as $J = \text{diag}(r_{11}^{-1}, \ldots, r_{NN}^{-1}, 0, \ldots, 0)$, where $r_{kk}$ denotes the $k^{th}$ diagonal element of the matrix R;

computing $B = JR^H$, where the Tomlinson Harashima precoder includes an interference pre-cancellation block denoted by B-I, I denotes an identity matrix, and interference pre-cancellation matrix B has structure of a lower triangular matrix; and computing a transmit filter matrix $F = \Sigma^{1/2} Q^H$ for a transmit filter, where $\Sigma$ is a diagonal matrix satisfying the power constraint: $\text{trace}(\Sigma) \leq P_t$.

16. The base station according to claim 15, wherein calculating the scalar weights for the UEs comprises:

defining a matrix G as $G = JE^H$;

determining the scalar weights $g_{ki}$ for the $i^{th}$ receive antenna of the $k^{th}$ UE as non-zero column entry of the $$\left(\sum_{m=1}^{m=k-1} r_m + i\right)^{th}$$

column of matrix G, where $r_m$ denotes a number of rows in the effective DL channel matrix $H_m$ corresponding to the $m^{th}$ UE.

17. The base station of claim 13, wherein the DL channel matrix H is $H=[H_1^H, \ldots, H_K^H]^H$, and wherein determining the receiver processing matrix $V_k$ for each of the K UEs comprises:

performing by the UEs SVD decomposition as $H_k = Y_k S_k W_k^H$, where matrix $Y_k$ denotes left singular vectors, $S_k$ denotes a diagonal matrix comprising singular values at main diagonal, and $W_k$ represents right singular vectors; and setting the estimated receiver processing matrix associated with the $k^{th}$ UE as $V_k = Y_k^H$.

18. The base station of claim 17, wherein computing the effective DL channel matrix $H_{eff}$ comprises computing by the UEs $$H_{eff} = \begin{bmatrix} H_1 \\ H_2 \\ \ldots \\ H_K \end{bmatrix} = \begin{bmatrix} W_1^H \\ W_2^H \\ \ldots \\ W_K^H \end{bmatrix};$$

where the matrix $W_k$ is formed by selecting columns of $W_k$;

wherein the UEs inform the BS of the effective DL channel matrix $H_{\mathit{eff}}$;

wherein performing the QR decomposition (QRD) of the effective DL channel matrix $H_{\mathit{eff}}$ with column pivoting comprises computing $H_{\mathit{eff}}^H = QR$; and wherein using the unitary matrix Q and the upper triangular matrix R to calculate B and F comprises:

defining an (L×L) diagonal matrix G with (L-N) trailing zero diagonal entries as $G = \operatorname{diag}(r_{11}^{-1}, \ldots, r_{NN}^{-1}, 0, \ldots, 0)$, where $r_{kk}$ denotes the $k^{th}$ diagonal element of the matrix R;

computing $B = GR^H$, where the Tomlinson Harashima precoder includes an interference pre-cancellation block denoted by B-I, I denotes an identity matrix, and interference pre-cancellation matrix B has structure of a lower triangular matrix; and computing a transmit filter matrix $F = \Sigma^{1/2} Q^H$ for a transmit filter, where $\Sigma$ is a diagonal matrix satisfying the power constraint: $\operatorname{trace}(\Sigma) \leq P_t$, wherein trace(.) indicates a sum of diagonal elements of matrix argument.

19. The base station of claim 18, wherein calculating the scalar weights for the UEs comprises:

determining the scalar weights $g_{ki}$ for the $i^{th}$ receive antenna of the $k^{th}$ UE as non-zero column entry of the $$\left( \sum_{m=1}^{m=k-1} r_m + i \right)^{th}$$

diagonal element of matrix G, where $r_m$ denotes the number of rows in $H_m$.

20. The base station of claim 13, wherein the Tomlinson Harashima precoder comprises:

a feedforward path;

a feedback path;

an interference pre-cancellation block denoted by B-I disposed in the feedback path, I being an identity matrix, and B being an interference pre-cancellation matrix;

a modulo unit disposed in the feedforward path to produce a stream of filtered vector symbols X which are fed back through the interference pre-cancellation block disposed in the feedback path, wherein an output signal of the interference pre-cancellation block is subtracted from a stream of user symbols and applied to the modulo unit in the feedforward path; and a transmit filter represented by the transmit filter matrix F for filtering the stream of filtered vector symbols X produced by the modulo unit disposed in the feedforward path.

* * * * *